United States Patent [19]
Aubert et al.

[11] 3,893,886
[45] July 8, 1975

[54] REMOVABLE DIAGRID FOR SUPPORTING THE FUEL ASSEMBLIES OF A NUCLEAR REACTOR

[75] Inventors: Michel Aubert, Pierrevert; Michel Bellier, Saint-Germain-en-Laye; Jean-Marie Berniolles, Pierrevert, all of France

[73] Assignee: Commissariat a l'Energie Atomique, Paris, France

[22] Filed: Jan. 15, 1973

[21] Appl. No.: 323,636

[30] Foreign Application Priority Data
Jan. 20, 1972 France .......................... 72.01864

[52] U.S. Cl. ................ 176/87; 176/61; 176/64
[51] Int. Cl. .................................... G21c 15/00
[58] Field of Search ............. 176/87, 50, 61, 64

[56] References Cited
UNITED STATES PATENTS

| | | |
|---|---|---|
| 2,961,393 | 11/1960 | Monson .......................... 176/61 |
| 3,235,465 | 2/1966 | McDaniel et al. ................ 176/87 |
| 3,671,394 | 6/1972 | Bernath et al. .................. 176/87 |
| 3,682,774 | 8/1972 | Beyer ............................. 176/87 |
| 3,785,924 | 1/1974 | Notari ............................ 176/87 |

*Primary Examiner*—Benjamin A. Borchelt
*Assistant Examiner*—C. T. Jordan
*Attorney, Agent, or Firm*—Cameron, Kerkam, Sutton, Stowell & Stowell

[57] ABSTRACT

A removable diagrid for supporting fuel assemblies in sodium-cooled fast reactors and consisting of a single-unit assembly which is laid on an internal annular shoulder formed in the lateral cylindrical shell of a vertical reactor tank.

The single-unit assembly comprises two parallel and horizontal support plates which are rigidly fixed to an annular distribution box element and braced by vertical hollow columns in which the lower ends of the fuel assemblies to be supported are engaged, a toric manifold for a coolant fluid at high pressure, and vertical ducts which open at one end into the manifold and at the other end into the annular box element.

4 Claims, 2 Drawing Figures

REMOVABLE DIAGRID FOR SUPPORTING THE FUEL ASSEMBLIES OF A NUCLEAR REACTOR

This invention relates to a diagrid or support structure for the fuel assemblies which form the core of a nuclear reactor, particularly a so-called fast reactor in which the cooling of said assemblies and the removal of heat produced by fission are carried out by means of a continuous circulation of liquid sodium in contact with the fuel assemblies.

It is known that, as a direct result of the constructional design and mode of cooling adopted, reactors of this type have two distinct zones in which different conditions of temperature and pressure are maintained, and especially a high-pressure zone which is provided upstream of the fuel assemblies with respect to the direction of circulation of the sodium which is brought to its minimum temperature in said first zone, and a second zone located downstream in which the sodium which has become heated in contact with the fuel assemblies is at a lower pressure, in particular as a result of the pressure drop which is created as the sodium passes through the diagrid and the fuel assemblies which are supported by this latter. Broadly speaking, it can be considered that the diagrid defines the boundary between these two zones. The hot sodium flows out above the reactor core after passing through heat exchangers in which it releases its heat to a secondary fluid and, after cooling, is recycled by circulating pumps which return the sodium at high pressure beneath the reactor core towards the diagrid and the fuel assemblies. Under these conditions, it is clearly apparent that the diagrid of a reactor of this type must meet a number of essential requirements: in the first place, it must be ensured that said diagrid supports and maintains the fuel assemblies in the vertical position while permitting suitable and homogeneous distribution of the coolant sodium. Moreover, the design of said diagrid must be such that its disassembly may be an exceptional but not impossible operation, especially in order to permit replacement by another diagrid in the event of a major fault condition in the reactor. Taking the residual activity and contamination into account, these operations can be carried out only from a distance.

In low-power reactors, diagrids of the type mentioned above have already been constructed and are known to consist of a grid formed of a plate having a substantial thickness and pierced by apertures in which the bottom end-fittings of the fuel assemblies are engaged by means of leak-tight seatings. The grid is supported by the cylindrical shell of a reactor vessel or primary tank which contains the core assembly and pipes for the supply of cold sodium at high pressure are welded to the bottom of said tank beneath the diagrid. In point of fact, if consideration is given to the relatively small dimensions of the grid, there is not in this case any really complex problem in regard to disassembly of the diagrid and especially in regard to removal of the leak-tight connection which is necessary during operation at the level of application of the grid against the cylindrical shell of the reactor tank.

On the other hand, in the case of high-power reactors, the diametral dimensions of the diagrid and of the tank as well as the pressure of sodium within this latter become such that it is no longer possible to have recourse to conventional design solutions by reason of the fact that the end-wall effect in particular, that is to say the effect of the high pressure on the bottom portion of the diagrid, is liable to produce unacceptable deformations. Similarly, the high flow rates which are necessary for cooling the fuel assemblies give rise to pressure drops which may in some cases be sufficient to result in separation of said fuel assemblies from the diagrid, thereby causing levitation of said assemblies under the pressure of the fluid. Finally, in this case, disassembly of the diagrid itself is usually a complex operation and may even prove impossible.

This invention relates to a diagrid for supporting the fuel assemblies of a high-power nuclear reactor which provides a solution to the problems mentioned above, especially by preventing the diagrid from being subjected to the total pressure of the coolant fluid, it being also possible by virtue of the constructional arrangements which are contemplated to disassemble said diagrid without causing any impairment during operation of the leak-tightness which is necessary between the periphery of the diagrid and the cylindrical shell of the tank against which said diagrid is applied and of the integrity of the piping through which the sodium at high pressure is conveyed to said diagrid.

The diagrid under consideration is accordingly made up of a single-unit assembly which is laid by means of a horizontal peripheral bearing surface on an internal shoulder formed in the lateral cylindrical shell of a reactor tank having a vertical axis which surrounds the diagrid and the reactor core, said single-unit assembly being made up of two parallel and horizontal support plates which are braced with respect to each other by vertical hollow columns in which the lower ends of the fuel assemblies to be supported are engaged in coaxial relation therewith, the diagrid being characterized in that the horizontal support plates are rigidly fixed at their periphery to an annular box element for the distribution of a coolant fluid at high pressure which is conveyed to the diagrid by means of a toric manifold, said manifold being connected to the annular box element and rigidly fixed beneath the bottom support plate by locking means which are independent of said support plate and said annular box element, vertical ducts being so arranged as to open at one end into the manifold and at the other end into the annular box element, the upper ends of said ducts being passed through apertures which are formed in the opposite bottom wall of the annular box element and which are surrounded by coaxial collars welded to said ducts at the end faces thereof.

In accordance with a particular feature of the diagrid under consideration, the annular box element is provided on the side remote from and opposite to each aperture which is traversed by a supply duct with openings which provide access to the ends of said ducts and are normally closed by removable seal plugs.

In accordance with yet another feature, the lower support plate is connected beneath the diagrid to a stiffening floor-plate structure, an open space being defined within said structure and intended to communicate with that region of the reactor tank in which the coolant fluid is at a lower pressure as a result of the pressure drop across the fuel assemblies.

Further properties of a support diagrid as constructed in accordance with the invention will become apparent from the following description of one exemplified embodiment which is given by way of indication without any implied limitation, reference being made to the accompanying drawings, wherein.

Figure 1:
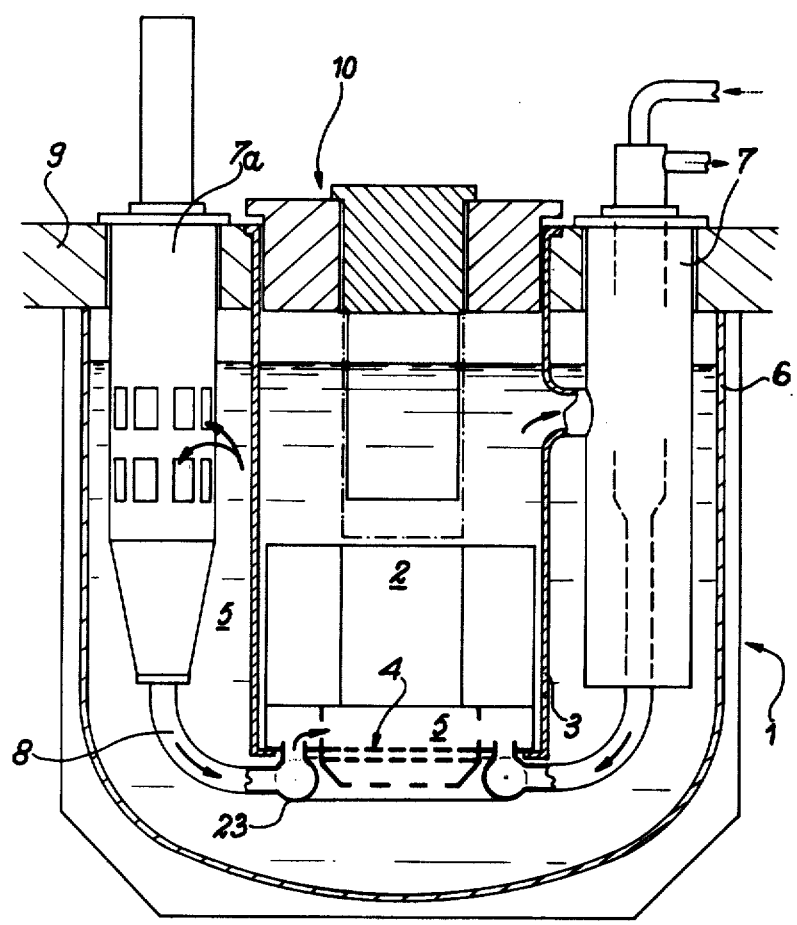
FIG. 1 is a diagrammatic longitudinal sectional view of a fast nuclear reactor comprising a support diagrid in accordance with the invention.

In FIG. 1, the reference 1 generally designates a fast reactor in which the core as shown diagrammatically at 2 is mounted within a metallic tank 3 or so-called primary tank and is supported within this latter on a diagrid 4 which will be described in detail hereinafter. The reactor core 2 is formed by fuel assemblies disposed in juxtaposed relation on a suitable lattice and supported at the lower ends thereof on the diagrid 4, said assemblies being cooled by a continuous circulation of liquid metal 5 and especially sodium. The sodium which is present within an outer containment vessel 6 or main vessel is first heated in contact with the fuel assemblies and conveyed towards a series of heat exchangers 7. In said heat exchangers, the sodium releases its heat to a secondary fluid before being recycled at the outlet of said exchangers by circulating pumps 7a, then conveyed at high pressure and low temperature through large-section ducts 8 towards the lower portion of the reactor core within the diagrid 4. The reactor is shown in FIG. 1 with its shield slab 9 which closes the top portion of the tank 6, said slab 9 being provided at the center and above the reactor core 2 with a system of plugs 10 which provide access to the reactor core and serve to carry out a number of different handling operations on the fuel assemblies.

Figure 2:
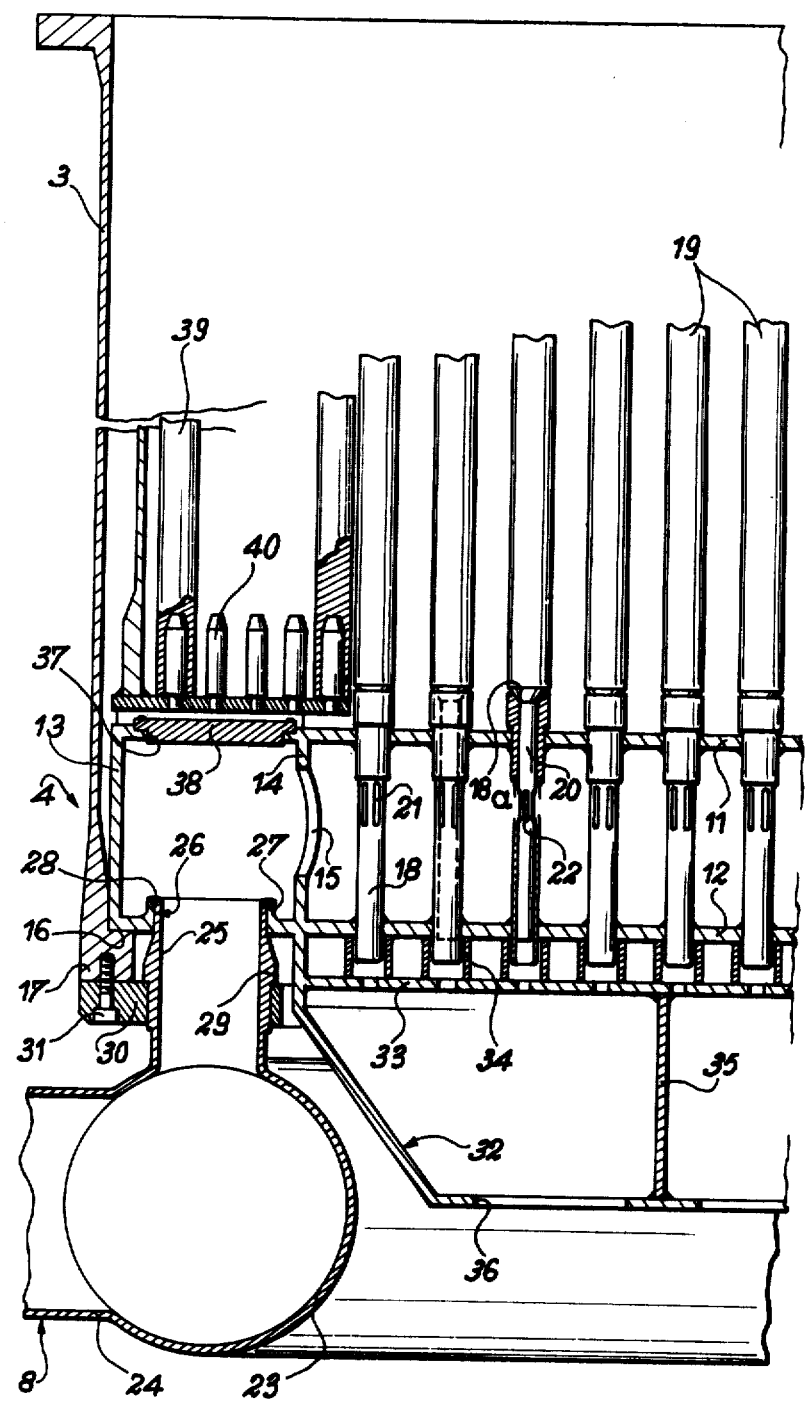
FIG. 2 is a sectional view to a larger scale in which a portion of the diagrid under consideration is illustrated in constructional detail.

FIG. 2 illustrates in greater detail the practical construction of the diagrid 4 in accordance with the invention. Said diagrid is mainly composed of two metallic support plates 11 and 12 respectively which extend horizontally and are joined at their periphery to an annular box element 13 having a cylindrical wall which communicates with the region located between the two support plates 11 and 12, said wall being pierced by a series of orifices 15 through which the coolant sodium is permitted to penetrate and pass through the diagrid before coming into contact with the fuel assemblies. The single-unit assembly which is formed by the two support plates 11 and 12 and the annular box element 13 is supported by a flat bearing surface 16 of the box element itself on an annular flange 17 which is formed at the lower portion of the lateral shell of the primary tank 3. Moreover, the two support plates 11 and 12 are braced with respect to each other by means of a series of hollow columns 18 disposed in spaced relation across said support plates on the lattice of the fuel assemblies 19; the lower end or bottom end-fitting 20 of each fuel assembly is engaged in a column 18 and rests on this latter by means of a leak-tight seating 18a. In order to permit the circulation of the sodium within the columns 18, these latter are provided with a series of elongated slots 21 located opposite to the holes or slots 22 formed in the corresponding end-fitting 20 of each fuel assembly which is engaged therein.

The coolant sodium is supplied to the annular box element 13 by means of a manifold 23 having a generally toric shape and placed beneath the diagrid 4, said manifold being rigidly fixed to the annular box element by means of a removable leak-tight connection. To this end, the manifold 23 communicates with the ends 24 of the ducts 8 provided for delivery of the sodium which is derived from the circulating pumps (as shown in FIG. 1) and which is distributed from said manifold into the annular box element 13 by means of a series of vertical ducts 25 which open at one end into the manifold and at the other end into inlet apertures 26 formed in the bottom wall of the annular box element 13. As an advantageous feature, the leak-tight connection between the end of each distribution duct 25 and the corresponding aperture 26 is provided by means of a collar 27 which is coaxial with the duct 25 and placed around each inlet aperture 26, said collar 27 and said duct 25 being rigidly fixed at the end faces thereof by means of a weld bead 28. Furthermore, in order that the manifold 23 and the supply ducts 25 should be supported independently of the connection aforesaid, provision is made on each duct 25 beneath the annular box element 13 for an annular shoulder 29 which cooperates with an anchoring ring 30, said ring being mounted beneath the end of the cylindrical shell of the primary tank 3 and locked in position against this latter by means of screws 31.

In order to ensure suitable stiffening of the diagrid 4 and especially of the bottom support plate 12, said plate is finally rigidly fixed to a floor-plate structure 32 formed of a sheet-metal plate 33 which extends parallel to the support plate and is joined to this latter by means of vertical spacers 34 and stiffening webs 35. The bottom of the floor-plate structure 32 is provided with openings 36 so that the sodium which is present outside the diagrid 4, or in other words outside the sodium which is in contact externally with the fuel assemblies 19, can fill the internal region of said floor-plate structure and thus be in direct contact with the bottom support plate 12. Both support plates are thus wholly immersed in the sodium which is at high pressure within the interior of the diagrid and at a lower pressure outside this latter; this lower pressure corresponds to the high pressure reduced by the pressure drop across the diagrid and fuel assemblies. The arrangement of the circulation system can accordingly be calculated so that the complete diagrid assembly should be at a pressure such that the resultant of the pressure forces on said diagrid should be of a low order, thereby ensuring hydraulic locking of the different fuel elements within the diagrid columns. Moreover, the values of the different pressures and temperatures can be adjusted so that the temperature gradients across the diagrid should be always limited to acceptable values during normal operation.

The particular form of construction of the diagrid 4 also permits ready disassembly of this latter, especially for the purpose of disconnecting said diagrid from the supply ducts 25 which connect it to the toric manifold 23. Apart from the removal of the core assemblies, this disassembly operation entails the need for destruction of the weld beads 28 and removal of the single-unit assembly formed by the two support plates 11 and 12 and the annular box element 13. To this end, the top wall of said box element is provided at the level of and opposite to each duct 25 with access openings 37 which are normally closed by leak-tight and removable seal plugs 38. Dummy neutron shield elements are normally disposed above said seal plugs and are formed especially by steel rods 39 fitted over positioning end-pins 40, said steel rods being intended to form around the reactor core 2 proper a lateral holding structure which is conventional in reactors of this type.

Under these conditions, when it is desired to carry out the operation which consists in disassembling the diagrid and which can clearly take place only after total removal of the core assemblies and dumping of the sodium within the primary tank 3, and since the diagrid 4 is simply laid on the portion 17 of the cylindrical shell of said primary tank, it is only necessary to remove the seal plugs 38 provided at the top portion of the annular box element 13 in order to reach the weld beads 28 by means of any suitable servicing apparatus and then, after destruction of these welds, to lift the complete diagrid assembly which is separated from the supply ducts 25 without modifying the particular positioning of these latter with respect to the tank. After removal, another diagrid can be placed in position so that exact correspondence with the duct locations is again ensured, new weld beads 28 being necessary only to restore leak-tightness of the assembly. These operations on the weld beads can readily be carried out by remote control by means of any suitable tooling equipment, especially through an opening of small diameter formed in the system of plugs 10 (shown in FIG. 1) which is provided at the top portion of the shield slab 9.

As is readily apparent and as has in any case been brought out by the foregoing, the invention is clearly not limited solely to the exemplified embodiment which has been more especially described with reference to the drawings but extends to any or all alternative forms.

What we claim is:

1. A removable diagrid for a nuclear reactor having fuel assemblies supported by the diagrid, a lateral cylindrical shell for a reactor tank and a reactor core, said diagrid being made up of a single-unit assembly which is laid by means of a horizontal peripheral bearing surface on an internal shoulder formed in said lateral cylindrical shell of said reactor tank having a vertical axis which surrounds the diagrid and said reactor core, said single-unit assembly being made up of two parallel and horizontal support plates which are braced with respect to each other by vertical hollow columns in which the lower ends of the fuel assemblies to be supported are engaged in coaxial relation therewith, wherein the horizontal support plates are rigidly fixed at their periphery to an annular box element for the distribution of a coolant fluid at high pressure which is conveyed to the diagrid by means of a toric manifold, said manifold being connected to the annular box element and rigidly fixed beneath the bottom support plate by locking means which are independent of said support plate and said annular box element, vertical ducts being so arranged as to open at one end into the manifold and at the other end into the annular box element, the upper ends of said ducts being passed through apertures which are formed in the opposite bottom wall of said annular box element and which are surrounded by coaxial collars welded to said ducts at the end faces thereof.

2. A removable diagrid according to claim 1, wherein the annular box element is provided on the side remote from and opposite to each aperture which is traversed by a supply duct with openings which provide access to the ends of said ducts and are normally closed by removable seal plugs.

3. A removable diagrid according to claim 1, wherein the lower support plate is connected beneath the diagrid to a stiffening floor-plate structure, an open space being defined within said structure and intended to communicate with that region of the reactor tank in which the coolant fluid is at a lower pressure as a result of the pressure drop across the fuel assemblies.

4. A removable diagrid according to claim 1, wherein the hollow columns for bracing the support plates are provided with elongated slots through which the coolant fluid is permitted to pass and which are disposed opposite to openings formed in the lower portion of the fuel assemblies which penetrate into said columns.

* * * * *